Jan. 19, 1937.  W. E. AYNGE  2,068,310
DISTRIBUTING MECHANISM OF TYPOGRAPHICAL
COMPOSING AND DISTRIBUTING MACHINES
Filed Oct. 4, 1935  3 Sheets-Sheet 1
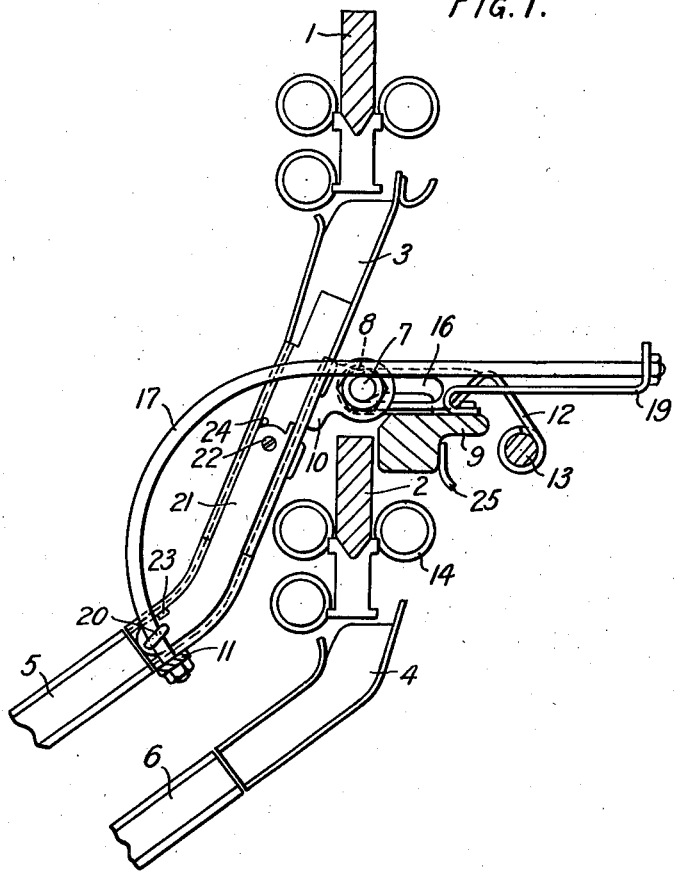
INVENTOR.
William E. Aynge
By Morrison Kennedy & Campbell
Attorneys Jan. 19, 1937.     W. E. AYNGE     2,068,310
DISTRIBUTING MECHANISM OF TYPOGRAPHICAL
COMPOSING AND DISTRIBUTING MACHINES
Filed Oct. 4, 1935     3 Sheets-Sheet 2
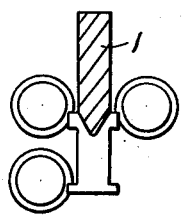
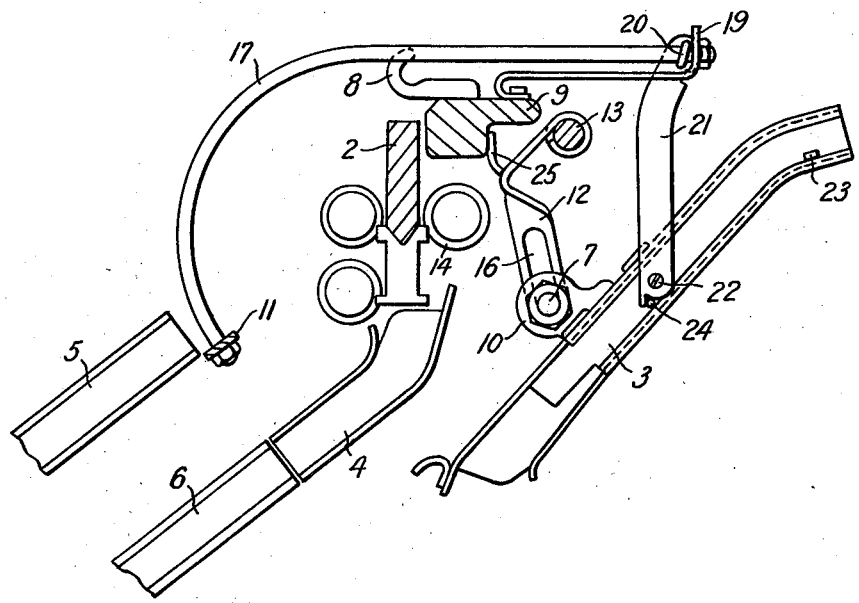
INVENTOR.

Patented Jan. 19, 1937

2,068,310

UNITED STATES PATENT OFFICE 2,068,310

DISTRIBUTING MECHANISM OF TYPOGRAPHICAL COMPOSING AND DISTRIBUTING MACHINES

William Edgar Aynge, Upper Sydenham, London, England, assignor, by mesne assignments, to Mergenthaler Linotype Company, Brooklyn, N. Y., a corporation of New York Application October 4, 1935, Serial No. 43,484
In Great Britain October 11, 1934

9 Claims. (Cl. 199—39)

This invention relates to distributing mechanism of typographical composing and distributing machines such as those known commercially under the trade-mark "Linotype", of the kind which are provided with a plurality of fixed distributors and a plurality of superposed magazines cooperating therewith. In certain machines of this kind the distributors are arranged vertically one above another, and the magazine entrance which conducts matrices from an upper distributor to an upper magazine, extends inwardly in front of a lower distributor, and the said entrance cannot be moved about a pivot near its lower end, as is usual in machines having step-wise arranged distributors.

It has therefore been proposed, in connection with vertically superposed distributors, to support an upper magazine entrance on pivot studs at the rear of the entrance, resting in open bearings on the distributor frame above the next lower distributor, so that the entrance may be tilted rearwardly about the axis of said studs to give access to the entrance channels, or lifted out of the open bearings and removed from the machine to permit of access to other parts. The necessity of such removal is avoided in an alternative arrangement according to which it has been proposed to pivot an upper magazine entrance about an axis remote from the respective distributor so that the said entrance may, by an arcual movement as a whole, be moved bodily rearwardly between the distributors to an inverted position at the rear.

The object of the present invention is to provide a construction in which the advantages of the last-mentioned arrangement may be secured, while reducing the range of movement of the entrance and ensuring a more convenient location thereof when in its inoperative position.

To this end an upper magazine entrance according to the invention is arranged to be tiltable about a pivot located at the rear of the entrance and above the next lower distributor, and the support for said pivot is itself tiltable about a second pivot arranged rearwardly of the first-mentioned pivot.

The invention is hereinafter described with reference to the accompanying drawings, illustrating one constructional form thereof. In the said drawings:—

Figure 1 is a side elevation of a distributing mechanism showing an upper magazine entrance in its normal operative position;

Figure 2 is a similar view showing the upper magazine entrance in its inoperative position.

Figure 3:
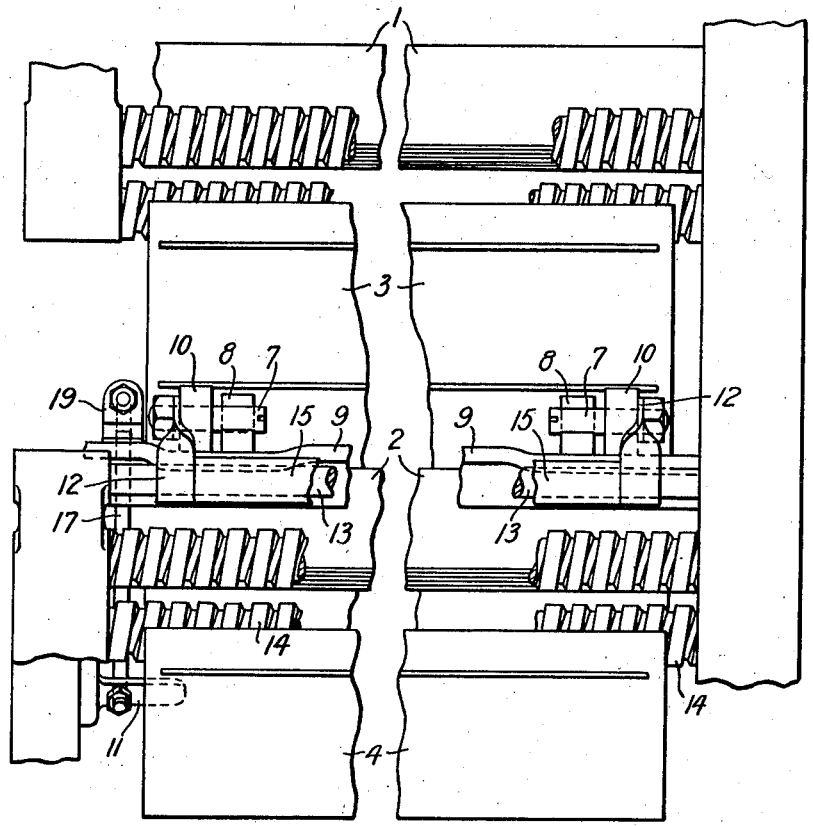
Figure 3 is a rear elevation, partly broken away, of the parts as shown in Figure 1.

In the drawings, the invention is shown as applied to a distributing mechanism according to the first of the above mentioned known arrangements, wherein vertically superposed distributors 1, 2, deliver matrices into the respective magazine entrances 3, 4, by which the matrices are conducted to the appropriate magazines 5, 6.

The upper magazine entrance 3 is supported by pivot studs 7 resting in open bearings 8, secured to the distributor beam 9, the studs 7 being carried in lugs or brackets 10 fast to the entrance, and at its lower end the entrance rests on supporting brackets 11 fixed to the machine frame.

The known arrangement, as so far described, permits the entrance 3 to be tilted rearwardly about the axis of the studs 7 to give access to the entrance channels, and to be removed from the machine by lifting it out of the open bearings 8 to give access to other parts. In accordance with the invention, such access is permitted without the necessity of removing the entrance 3 from the machine.

In the constructional form of the invention illustrated, the desired result is attained by providing a pair of arms 12 pivotally mounted at the rear of the distributor beam 9, which arms extend upwardly and rearwardly over the said beam, and at their inner ends engage with the pivot studs 7. The arms 12 may be pivoted conveniently on the shaft 13, which serves to support the screw 14 of the lower distributor, and they are preferably formed on or secured to the opposite ends of a sleeve 15 surrounding the said shaft.

At their inner ends the arms 12 are formed with slots 16 within which the studs 7 engage, to permit of a slight rearward movement of the studs 7 in their bearings 8 prior to the first tilting movement, so as to ensure that during such tilting movement the entrance will not foul any matrices that may be suspended from the distributor bar.

For guiding the entrance 3 in its movements into and out of operative position, there is provided, adjacent one side of the entrance, a rail 17 fixed at one end, secured to the respective entrance support bracket 11, and at its other end to a bracket 19 mounted on the distributor beam 9, this rail being embraced by an eye 20 fixed to a plate 21 pivoted at 22 to the side block of the entrance. A lug 23 and pin 24 projecting laterally from the entrance slide block serve to limit pivotal movement of the plate 21 in respectively opposite directions.

From a comparison of Figures 1 and 2 the operation of the devices above described will be apparent. When the operator wishes to have access to the channels of the entrance 3 or to other parts of the machine obstructed by the entrance in its normal position, the entrance may be first tilted rearwardly about the axis of the pivot studs 7, the slots 16 allowing an initial slight rearward movement of the pivot studs in the bearings, during which tilting movement the eye 20 is guided over the curved lower part of the guide rail 17, which is so formed that the said tilting movement is accompanied by a pivotal movement of the studs about the axis of the shaft 13. Continued downward movement of the upper end of the distributor 3 while the eye 20 is guided along the horizontal portion of the guide rail 17 brings the entrance to the final inoperative position in which it is shown in Figure 2, the outer end of the rail 17 serving, in conjunction with the lug 23 and pin 24, as stops for the outward and downward movement of the entrance. A lug 25 projecting rearwardly from the distributor bracket may be further provided to support the upper end of the distributor in the inoperative position.

It is to be understood that the constructional form of the invention hereinbefore described and illustrated in the drawings is taken as a convenient example, and that modifications may be made therein without departing from the invention. For example, instead of the eye 20 being carried on a pivoted plate it may be swivelled on the side block of the magazine entrance, although it is to be understood that the pivoted plate arrangement provides for somewhat greater outward movement of the entrance than would be the case with such a swivelled mounting of the eye.

Having described my invention, I declare that what I claim and desire to secure by Letters Patent is:—

1. In a typographical composing and distributing machine, the combination of a plurality of vertically superposed distributors and magazine entrances arranged in overlapping relationship for conducting matrices from the distributors to a corresponding plurality of magazines, of a pivot for an upper magazine entrance located at the rear thereof and above the next lower distributor, and a support for the said pivot displaceable relatively to the distributors to carry the entrance from and to operative position.

2. In a typographical composing and distributing machine, the combination of a plurality of vertically superposed distributors and magazine entrances arranged in overlapping relationship for conducting matrices from the distributors to a corresponding plurality of magazines, of a pivot for an upper magazine entrance located at the rear thereof and above the next lower distributor, a support for the said upper magazine entrance pivot, and a pivot located at the rear of said upper magazine entrance pivot about which said support is tiltable.

3. In a typographical composing and distributing machine, the combination of a plurality of vertically superposed distributors and magazine entrances arranged in overlapping relationship for conducting matrices from the distributors to a corresponding plurality of magazines, of a pivot for an upper magazine entrance located at the rear thereof and above the next lower distributor, a support for the said upper magazine entrance pivot, a pivot located at the rear of said upper magazine entrance pivot about which said support is tiltable, and guide means adapted to constrain the movement of said entrance about its pivot during the movement of said support.

4. In a typographical composing and distributing machine, the combination of a plurality of vertically superposed distributors and magazine entrances arranged in overlapping relationship for conducting matrices from the distributors to a corresponding plurality of magazines, of pivot studs carried at the rear of an upper magazine entrance, fixed open bearings for said studs located above the next lower distributor, arms adapted to support said studs independently of said bearings and a pivotal support for said arms located at the rear of said bearings.

5. A combination according to claim 4, including a shaft extending parallel with the upper magazine entrance at the rear of the distributor and a sleeve in said shaft to which the stud supporting arms are operatively fast.

6. In a typographical composing and distributing machine, the combination of a plurality of vertically superposed distributors and magazine entrances arranged in overlapping relationship for conducting matrices from the distributors to a corresponding plurality of magazines, of pivot studs carried at the rear of an upper magazine entrance, fixed open bearings for said studs located above the next lower distributor, arms adapted to support said studs independently of said bearings, a pivotal support for said arms located at the rear of said bearings, a fixed guide rail located adjacent one side of said entrance, and a member on said entrance in slidable engagement with said rail.

7. In a typographical composing and distributing machine, the combination of a plurality of vertically superposed distributors and magazine entrances arranged in overlapping relationship for conducting matrices from the distributors to a corresponding plurality of magazines, of pivot studs carried at the rear of an upper magazine entrance, fixed open bearings for said studs located above the next lower distributor, arms adapted to support said studs independently of said bearings, a pivotal support for said arms located at the rear of said bearings, a fixed guide rail located adjacent one side of said entrance, a plate pivoted to the respective side of said entrance, a member secured to said plate in slidable engagement with said rail and stops associated with the entrance adapted to limit pivotal movement of said plate.

8. A combination according to claim 4, wherein the pivot studs extend through slots in the supporting arms.

9. In a typographical composing and distributing machine, the combination of a plurality of vertically superposed distributors and magazine entrances arranged in overlapping relationship for conducting matrices from the distributors to a corresponding plurality of magazines, of pivot studs carried at the rear of an upper magazine entrance, fixed open bearings for said studs located above the next lower distributor, arms adapted to support said studs independently of said bearings, a pivotal support for said arms located at the rear of said bearings, a fixed guide rail located adjacent one side of said entrance, a member on said entrance in slidable engagement with said rail, and a stop on said rail adapted to limit the sliding movement of said member during movement of the pivotal support to carry the entrance out of operative position.

WILLIAM EDGAR AYNGE.